2,878,238
PROCESS FOR RAISING THE MELTING POINT OF ACETONE-SOLUBLE COPOLYMERS

Marshall W. Duke and David A. Gordon, Midland, Mich., assignors to The Dow Chemical Company, Midland, Mich., a corporation of Delaware No Drawing. Application July 11, 1956
Serial No. 597,091

8 Claims. (Cl. 260—85.5)

This invention relates to a novel process for raising the melting point of certain acetone-soluble copolymers. More particularly it relates to such a process for raising the melting point of acetone-soluble copolymers composed of vinylidene chloride and acrylonitrile.

In U. S. 2,681,325 are disclosed certain copolymers of vinylidene chloride and acrylonitrile which are soluble in acetone in concentrations necessary for spinning continuous fibers and filaments and for casting continuous films. Those copolymers contain from 30 to 55 percent acrylonitrile and correspondingly from 70 to 45 percent vinylidene chloride. The acetone spinning dopes prepared with those polymers could be spun by either wet or dry spinning techniques, and the fibers so prepared were found to have an interesting family of properties for commercial use. Those fibers had one serious drawback, however. They had a softening range or melting point that was so low that the fabric woven from the fibers could not be ironed. Attempts were made to raise the melting point of the fibers by increasing the molecular weight of the copolymer. Other attempts involved the preparation of a more homogeneous copolymer by special polymerization techniques. Those attempts as well as all others either failed to raise the melting point of the fibers or destroyed the acetone solubility of the copolymer. It would be desirable to have a process for preparing acetone-soluble copolymers composed of vinylidene chloride and acrylonitrile having higher melting points than the prior copolymers and the provision of such a process is the principal object of this invention.

Other objects will be apparent as the description of the invention proceeds.

It has now been found that the melting point of articles prepared from acetone soluble copolymers of vinylidene chloride and acrylonitrile is raised by preparing an acetone dope comprising the copolymer, and an acetone soluble acetylenic diol and fabricating the dope into an article which is substantially acetone free.

The copolymers useful in the process of this invention are those described in U. S. 2,681,325 as containing from 30 to 55 percent by weight of acrylonitrile and correspondingly from 70 to 45 percent by weight of vinylidene chloride. Optimum results are obtained when the copolymer is one of 40 percent by weight of acrylonitrile and 60 percent vinylidene chloride. For use in continuous articles such as fibers and films the copolymers should have a molecular weight which would give a solution viscosity of at least 1.5 centipoises and not to exceed 2.5 centipoises when measured from a solution of 0.5 gram of the copolymer dissolved in 100 milliliters of dimethyl formamide at 25° C. Preferably the viscosity as thus measured should be between 1.8 to 2.2 centipoises.

Typical examples of useful acetylenic diols in the process of this invention include dimethyl hexynediol, dimethyloctynediol, 2,5-diphenyl-3-hexyne-2,5-diol, and 2,7-dimethylocta-3,5-diyne-2,7-diol.

For casting films and spinning fibers it is desirable to have a solution of from 10 to 20 percent by weight of the defined copolymer in acetone, and solutions of that concentration range may be easily prepared by stirring the polymer into the acetone at room temperature. Less stirring is needed when the acetone is warmed to 35° to 45° C. Following dissolution of the copolymer in the acetone the acetylenic diol may be dissolved in the dope. The order of dissolution of the copolymer and modifier is not critical, and, if desired, the acetylenic diol may be dissolved first, followed by the copolymer, or the dissolution of the ingredients may be carried out simultaneously.

To achieve the stated objective of the process of this invention of raising the melting point of the article, the acetylenic diol should be employed in an amount of from 1 to 5 percent of the weight of the copolymer. When less than 1 percent is used there is very little if any elevation of the melting point, while the use of more than 5 percent can cause insolubility of the product.

Following preparation of the dope, a continuous article is fabricated by casting a film or by wet or dry spinning fibers. The articles are then air dried or subjected to moderate temperatures to remove any readily volatile matter, after which the articles are subjected to an elevated temperature for a short time to cause chemical reaction between the copolymer and the acetylenic diol and to fuse or to sinter the article. For example, exposure of an article to a temperature of about 150° C. for about 15 minutes will suffice. Temperatures of 150° to 200° C. are most useful. When the articles are exposed to such temperatures for prolonged periods the products become insoluble.

The inventors believe that the elevation in melting point without loss of acetone solubility is due principally to a minor amount of cross-linking of the copolymer chains. Fibers, fabrics and films produced in accordance with this process are capable of being ironed at the usual temperatures used for ironing synthetic fibers and the fabrics produced therefrom. If desired, an acetone insoluble product may be prepared by using greater than the stated amounts of modifier and subjecting the formed article to elevated temperatures for prolonged periods.

By way of illustration, several dopes were prepared from 240 parts by weight of anhydrous acetone, 57 parts by weight of a copolymer composed of 60 percent vinylidene chloride and 40 percent acrylonitrile, and 3 parts by weight of several acetylenic diols. For comparative purposes, one dope had no acetylenic diol compound. Each of the dopes was cast onto a stainless steel plate to a dry thickness of 0.0025 inch. The wet cast films were air dried for 24 hours followed by an oven drying for one hour at 55° C. to remove substantially all of the acetone. The dried films were then heated at 150° C. for up to 60 minutes after which strips of the films ⅛ inch wide were cut for determining an apparent melting point and solubility. The apparent melting point is a melting point under a low load, and often provides a sharp point for many polymeric materials which soften over a range of temperatures and show no true melting point. The determination was made by weighting one end of the film strip equivalent to 1400 gms./cm.$^2$ of cross-section. The other end of the strip was clamped so that the weighted end hung free. A variable resistance cylindrical heating element was placed so as to contact about 0.5 inch of the film. The heating element was brought to 175° C. before mounting the strip. The temperature was then raised until the film strip either melted and broke or until 300° C. was reached. If the film had not melted at 300° C. it was considered to have been adequately cross-linked.

Acetone solubility was determined by immersing the strips in acetone for one hour at room temperature. The strips were then examined visually and rated arbitrarily as soluble, partially soluble, and insoluble.

The results are listed in Table I.

*Table I*

| Acetylenic diol | Apparent melting point (°C.) | Acetone Solubility | |
|---|---|---|---|
| | | After 15 minutes' exposure | After 60 minutes' exposure |
| Dimethyl hexynediol | 300 | S | I |
| Dimethyl octynediol | 300 | S | PS |
| 2,5-diphenyl-3-hexyne-2,5-diol | 300 | S | PS |
| 2,7-dimethylocta-3,5-diyne-2,5-diol | 300 | S | I |
| None | 199 | S | S |

It can be seen that the melting points of the films prepared in accordance with this invention are at least 100° C. higher than the blank which contained no agent.

When the heat stability of the film strips was compared it was found that the strips of this invention were at least as stable as the blank, i. e., they showed no more, and often less evidence of discoloration after prolonged thermal exposure.

The invention has been illustrated by tests carried out on film strips. It is equally applicable to the improvement in thermal properties of filamentary products made from the acetone solutions of the copolymers and acetylenic diols.

We claim:

1. A process for increasing the melting point of acetone-soluble copolymers of vinylidene chloride without destroying acetone solubility comprising sequentially preparing an acetone solution of a copolymer composed of from 30 to 55 percent by weight of acrylonitrile and correspondingly from 70 to 45 percent by weight of vinylidene chloride and from 1 to 5 percent of the weight of said copolymer of an acetone-soluble acetylenic diol, removing acetone from the solution, and finally subjecting the acetone-free composition to an elevated temperature for at least about 15 minutes and until the melting point of the copolymer has been raised.

2. The process claimed in claim 1, wherein said acetone solution contains from 10 to 20 percent by weight of said copolymer.

3. The process claimed in claim 1, wherein said copolymer is composed of 40 percent by weight of acrylonitrile and 60 percent by weight of vinylidene chloride.

4. The process claimed in claim 1, wherein said elevated temperature is at least 150° C.

5. The process claimed in claim 1, wherein the solution of copolymer and acetylenic diol is spun in filamentary form and the resulting product is freed from acetone and heated to a temperature of 150° to 200° C.

6. The process claimed in claim 1, wherein said acetylenic diol is dimethylhexynediol.

7. The process claimed in claim 1, wherein said acetylenic diol is 2,5-diphenyl-3-hexyne-2,5-diol.

8. The process claimed in claim 1, wherein said acetylenic diol is 2,7-dimethylocta-3,5-diyne-2,7-diol.

References Cited in the file of this patent

UNITED STATES PATENTS

| 2,499,477 | Field | Mar. 7, 1950 |
| 2,603,622 | Berger et al. | July 15, 1952 |
| 2,681,325 | Abernethy | June 15, 1954 |